United States Patent [19]
Izawa et al.

[11] Patent Number: 5,945,956
[45] Date of Patent: Aug. 31, 1999

[54] VEHICULAR EXTERIOR TRIM ACCESSORY HAVING A BUILT-IN ANTENNA

[75] Inventors: Shogo Izawa, Toukai; Yoshiro Hattori, Toyoake; Tadahiko Kohama; Nobutoshi Hase, both of Nishio; Takaaki Nakano, Kariya; Yoichi Kaneyasu, Nagoya; Takayuki Ohira, Toyota; Takayoshi Ito, Nagoya; Tsuneyuki Koike, Anjyo, all of Japan

[73] Assignee: Aisin Seiki Kabushiki Kaisha, Aichi-pref., Japan

[21] Appl. No.: 08/916,195

[22] Filed: Aug. 21, 1997

[30] Foreign Application Priority Data

Feb. 25, 1997 [JP] Japan ................................ 9-041140

[51] Int. Cl.$^6$ .................................................. H01Q 1/32
[52] U.S. Cl. .............................. 343/713; 343/711; 29/600
[58] Field of Search ............................ 343/713, 700 MS, 343/872, 712, 711, 873; 29/600; H01Q 1/32

[56] References Cited

U.S. PATENT DOCUMENTS

| 4,760,402 | 7/1988 | Mizuno et al. | 343/713 |
| 5,629,712 | 5/1997 | Adrian et al. | 343/713 |
| 5,757,327 | 5/1998 | Yajima et al. | 343/713 |

FOREIGN PATENT DOCUMENTS

| 61-89824 | 5/1986 | Japan . |
| 3-104302 | 5/1991 | Japan . |

*Primary Examiner*—Hoanganh Le
*Attorney, Agent, or Firm*—Hazel & Thomas, PC

[57] ABSTRACT

A vehicular exterior trim accessory having a built-in antenna body is constructed to include: a hollow body 21 blow-molded into a predetermined shape having an internal space; and an antenna body 3 fixed in the hollow body 21 and arranged in the internal space by the blow-molding method. The hollow body 21 and the antenna body 3 are made integral.

8 Claims, 9 Drawing Sheets

VEHICULAR EXTERIOR TRIM ACCESSORY HAVING A BUILT-IN ANTENNA

BACKGROUND OF THE INVENTION

The present invention relates to a vehicular exterior trim accessory having a built-in antenna and, more particularly, to an antenna built-in exterior trim accessory formed by a blow molding process of a synthetic resin.

The antenna built-in vehicular exterior trim accessory of this kind is known in the prior art in Japanese Patent Laid-Open Publication No. 104302/1991. What is disclosed in this prior publication is a solid spoiler or sunroof having a built-in antenna, which is manufactured by fitting in a split metallic mold or die for an injection molding a film antenna composed of an electric conductive paint applied in a predetermined pattern on a plastic sheet of ABS or polypropylene, by clamping the mold, and by injecting for example phenol resin material into the mold.

The antenna built-in solid spoiler thus manufactured is made so solid that it takes much resin material, thus raising its cost and making it too heavy for convenient handling. It has, therefore, been desired to develop a hollow exterior trim accessory having a built-in antenna.

A hollow plastic product for the vehicular exterior trim accessory is disclosed in Japanese Patent Laid-Open Publication No. 89824/1986. According to this publication, a fuel tank is formed by blow-molding process wherein a wave-suppressing member is arranged in a plastic parison (a tube of plastic material), the two tip ends of the parison are press-fitted in the mold, and the pressurized air is injected into the parison to be inflated against the counter of the mold. Although the wave-suppressing member is integrated at its two tip ends with the parison, its side edges are spaced from the inner wall face to allow the flow of the internal fluid. As a result, the holding of the wave-suppressing member in the parison is so weak that the member may possibly resonate with the vibration of the vehicle. This problem is serious not for the fuel tank which is filled with the fluid while retaining a sufficient mounting strength with respect to the vehicle's body but serious for the antenna built-in spoiler, i.e., for the structure in which the wave-suppressing member is replaced by the antenna member and the tank is replaced by the spoiler. In short, a device is demanded for mounting the antenna member in the hollow spoiler body.

In addition, in the exterior trim accessory of the prior art, the conductive film antenna is prepared by applying a conductive paint to the plastic sheet so that the adhesion of the conductive film to the plastic sheet is not sufficient. This may deteriorate or deform the conductive film or the plastic sheet by the shearing force resulting from the difference in expansion between the paint and the plastic sheet when heated at the injection molding time or may cause slippage of the conductive film from the plastic sheet.

SUMMARY OF THE INVENTION

It is, therefore, an object of the present invention to solve the above-specified technical problems and to provide a vehicular exterior trim accessory having an antenna body mounted therein, and a process for manufacturing the hollow part.

According to the present invention, there is provided the basic means comprising: a hollow body molded into a predetermined shape having an internal space; and an antenna body fixed in the hollow body and arranged in the internal space by the blow-molding process, wherein the hollow body and the antenna body are made integral.

According to the present invention, moreover, the antenna body is constructed to include: a resin substrate melted and fixed integrally on the hollow body; and a conductive film formed in a predetermined pattern and fixed on the substrate by thermal spray-coating of a granular metal.

BRIEF DESCRIPTION OF THE DRAWINGS

FIG. 2 is a section taken along line II—II of FIG. 1;

FIG. 4b is a side elevation of FIG. 4a;

FIG. 5b is a side elevation of FIG. 5a;

FIG. 6b is a side elevation of FIG. 6a;

DETAILED DESCRIPTION OF THE PREFERRED EMBODIMENTS

Figure 1:
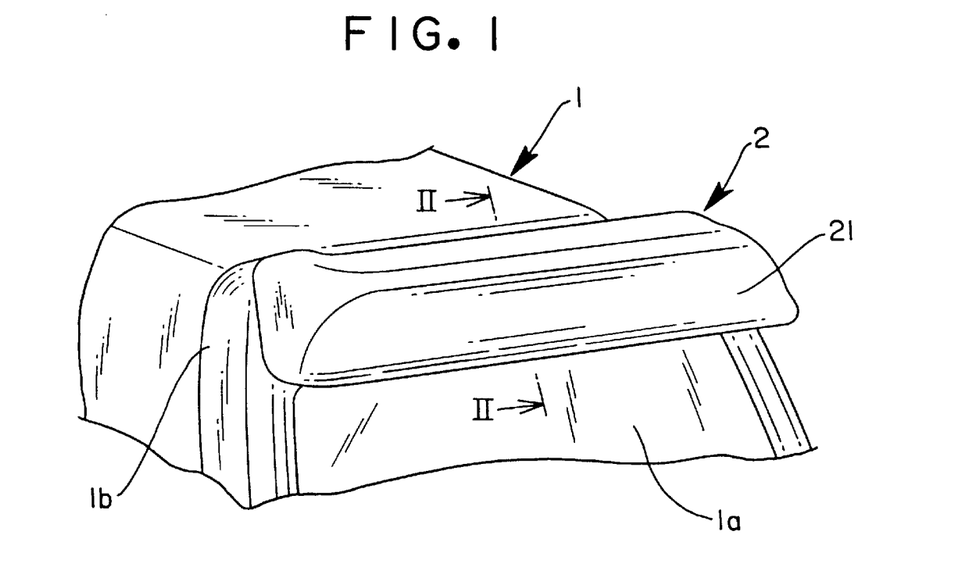
FIG. 1 is a perspective view showing a vehicle having its exterior trim accessory mounted thereon according to the present invention.
Figure 2:
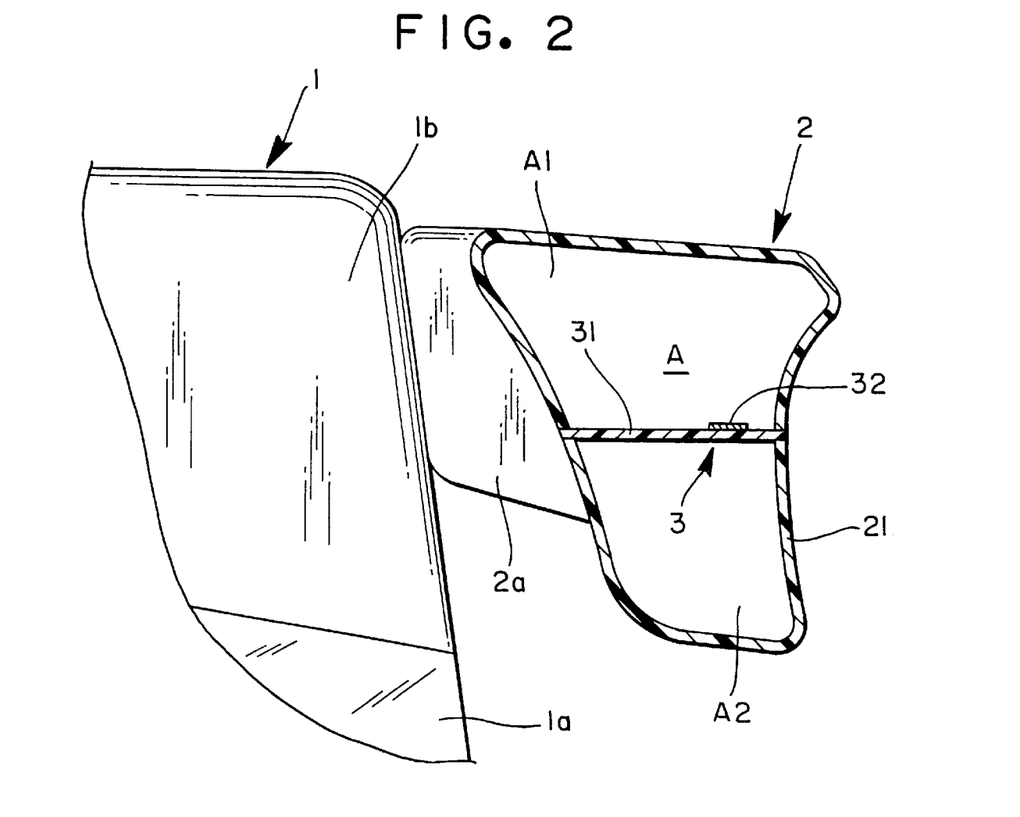

As shown in FIGS. 1 and 2, over the back window 1a of a vehicle 1, there is arranged a spoiler 2 which is fixed on the upper side of a back window 1a of the body 1b of a vehicle 1 through its leg 2a. This spoiler 2 is made of a hollow body 21 of a predetermined shape having an internal space A, which is made of a synthetic resin such as polyvinyl chloride (PVC). In this internal space A, there is mounted an antenna body 3 which is arranged generally in a horizontal position to partition the internal space A vertically into a first space A1 and a second space A2. Here, the arrangement of the antenna body 3 may be in a vertical position or at an inclination in view of radio waves receiving state.

Figure 3A:
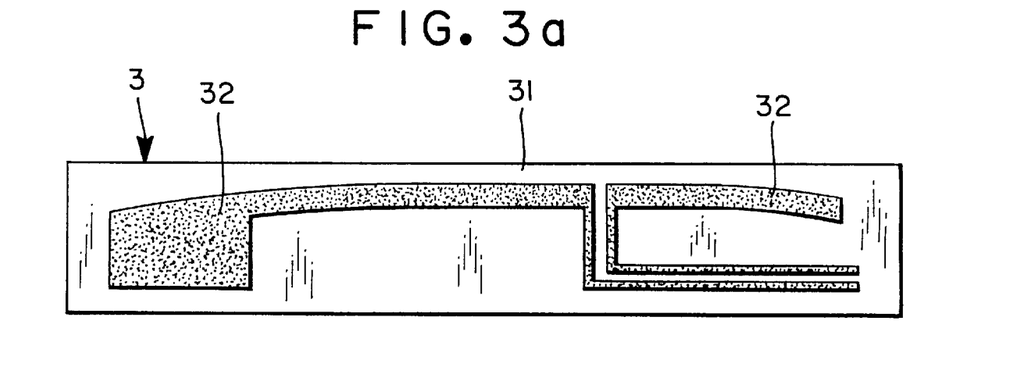
FIG. 3a is a top plan view showing an antenna body of the vehicular exterior trim accessory according to the present invention.

As shown in FIG. 3a, the antenna body 3 is constructed to include a flat plate 32 made of the same synthetic resin as that of the hollow body 21, and a conductive film 32. This conductive film 32 is provided for receiving radio waves such as AM, FM and/or GPS waves and is connected with the connector (not-shown) through the cable (not-shown) until it is led to the inside of the vehicle. Moreover, the conductive film 32 is given a predetermined pattern and is fixed on the flat plate 31 by the thermal spray-coating method, as will be described hereinafter.

Figure 3B:
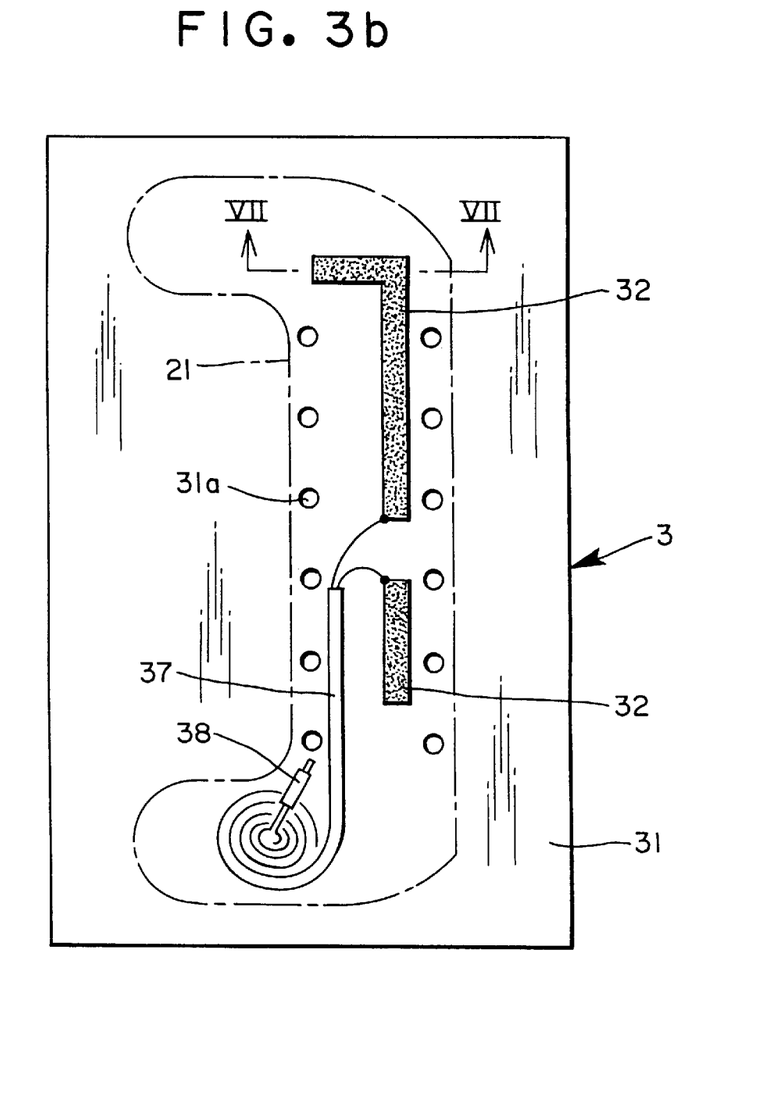
FIG. 3b shows another embodiment.

As shown in FIG. 3b, the antenna body 3 is constructed of the flat plate 31 made of the same synthetic resin as that of the hollow body 2, the conductive antenna film 32, the cable 37 and the connector 38. The conductive antenna film 32 for receiving AM, FM and/or GPS radio waves is fixed on the flat plate 31 by the hot-stamping or adhering method. The cable 37 is connected with the conductive film 32 and fixedly held on the flat plate 31. The connector 38 is connected with the leading end of the cable 37. In the flat plate 31, on the other hand, there are formed a plurality of through holes 31a in suitable positions. Here, the number and arrangement of the through holes 31a are determined considering the flow of the later-described air in the later-described parisons.

The spoiler 2 as described is manufactured by the following blow molding process.

Figure 4A:
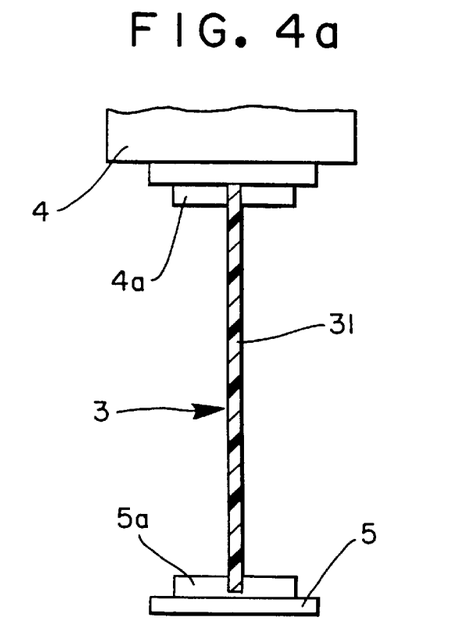
FIG. 4a is a schematic front elevation showing a process for manufacturing the vehicular exterior trim accessory according to the present invention.
Figure 4B:
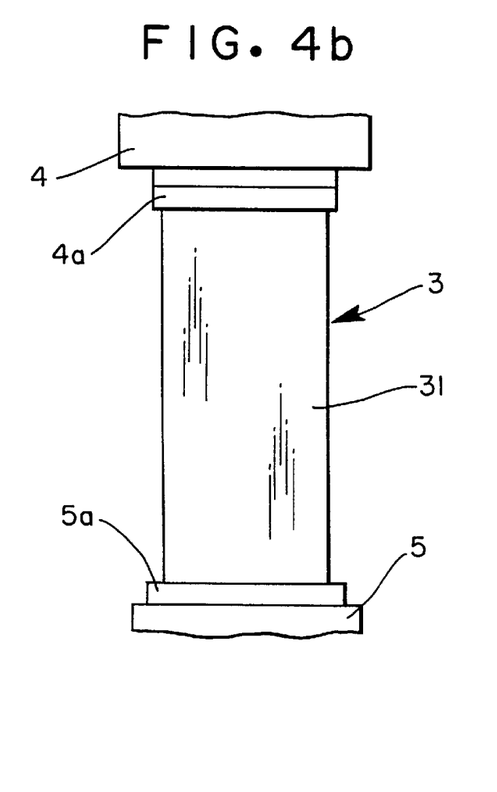

First of all, the antenna body 3 is fixed at its two sides on upper and lower stationary dies or jigs 4 and 5 by clampers 4a and 5a (as shown in FIGS. 4a and 4b).

Figure 5A:
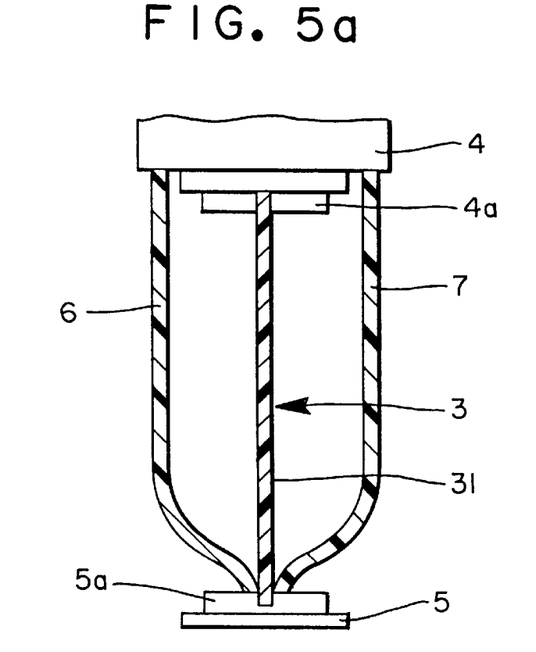
FIG. 5a is a schematic front elevation showing a process for manufacturing the vehicular exterior trim accessory according to the present invention.
Figure 5B:
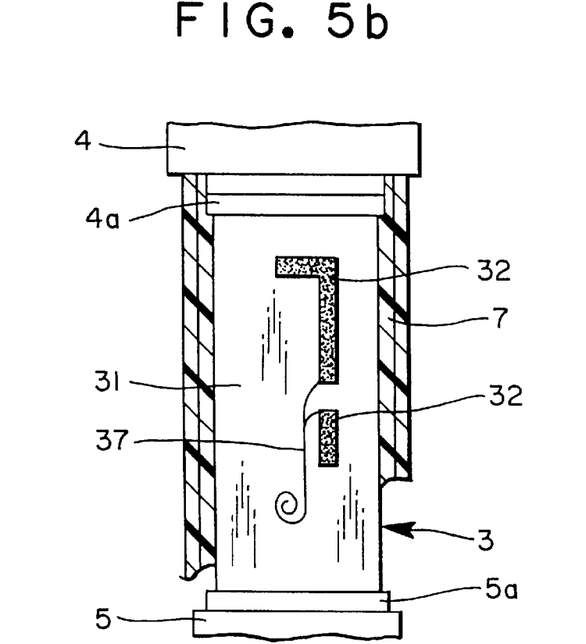

After this, a pair of parisons (or semi-melts) 6 and 7 to be molded into the hollow body 21 are ejected downwardly from the upper stationary die 4 to depend around the antenna body 3 and are clamped at their lower ends to hold the flat plate 31 of the antenna body 3. The air is then injected from the upper stationary die 4 to inflate the parisons 6 and 7 to some extent. The air thus injected into the space between the parisons 6 and 7 flows through the through holes 31a formed in the antenna body 3 thereby to internally press the parisons 6 and 7 substantially evenly all over their areas (as shown in FIGS. 5a and 5b).

Figure 6A:
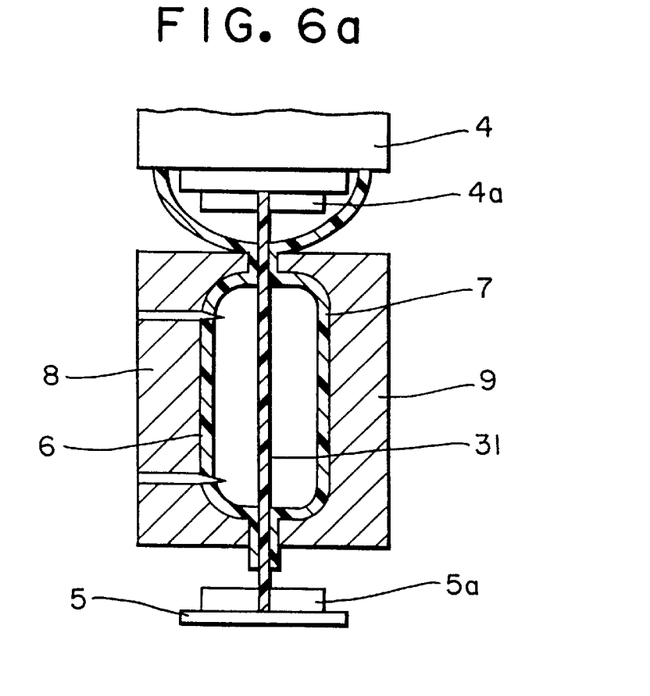
FIG. 6a is a schematic front elevation showing a process for manufacturing the vehicular exterior trim accessory according to the present invention.
Figure 6B:
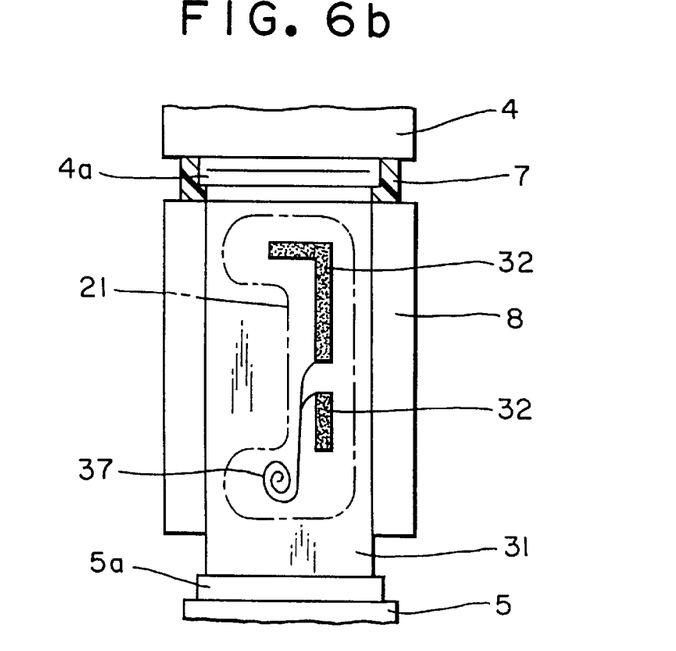

After this, a pair of molding dies 8 and 9 are applied to the outer faces of the parisons 6 and 7, and the relatively low pressure air is injected into the space between the parisons 6 and 7. As a result, the parisons 6 and 7 are pressed onto the molding dies 8 and 9 so that they are molded into the hollow body 21. At this time, the parisons 6 and 7 are welded to clamp the peripheral edge of the flat plate 31 of the antenna body 3. In this meanwhile, the air thus injected into the space between the parisons 6 and 7 flows through the through holes 31a, like before, to internally press the parisons 6 and 7 substantially evenly all over their areas (as shown in FIGS. 6a and 6b).

After cooling the dies, the molding dies 8 and 9 are parted from the parisons 6 and 7, and the solidified parisons 6 and 7 are removed. As a result, there is prepared the spoiler 2 which is formed of the hollow body 21 having the internal space A and the antenna body 3 in the space A. Here, the connector 38 of the antenna body 3 is led out from the hole (not-shown) which is formed in a predetermined position in the hollow body 21.

The spoiler 2 thus molded appears, as shown in FIG. 2, to have a construction in which a first shell and a second shell clamp the flat plate 31 of the antenna body 3 therebetween and abut against each other at their peripheral edges through the flat plate 31 of the antenna body 3. Here, the peripheral edge of the first shell, the peripheral edge of the second shell and the peripheral edge of the flat plate 31 of the antenna 3 are continuously welded into a unitary structure by the aforementioned below molding process.

In the embodiment as described, the through holes 31a are formed in the flat plate 31 but are not essential depending upon the arrangement of the antenna body 3 in the internal space A. If these through holes 31a are eliminated, the antenna body 3 can be fitted on the inner faces of the first shell and the second shell by the aforementioned pressurization of the blow molding process.

Figure 7:
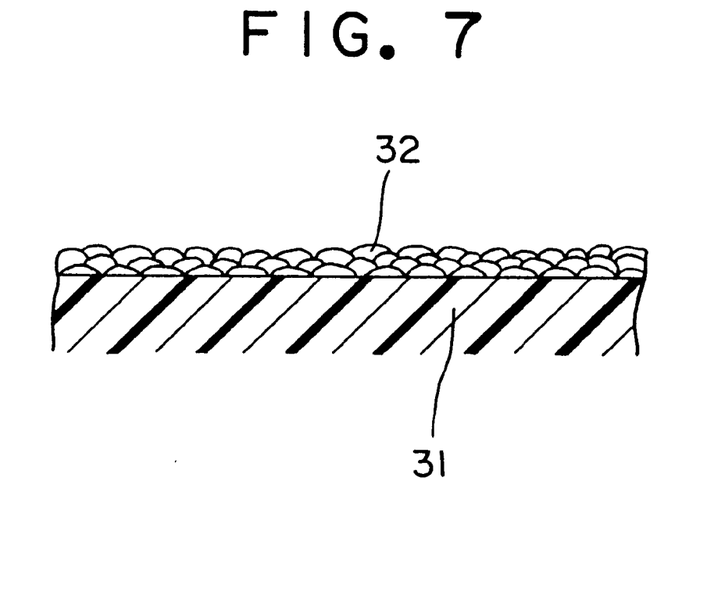
FIG. 7 is a section showing a conductive film and taken in the direction of arrows VII—VII of FIG. 3b.
Figure 8:
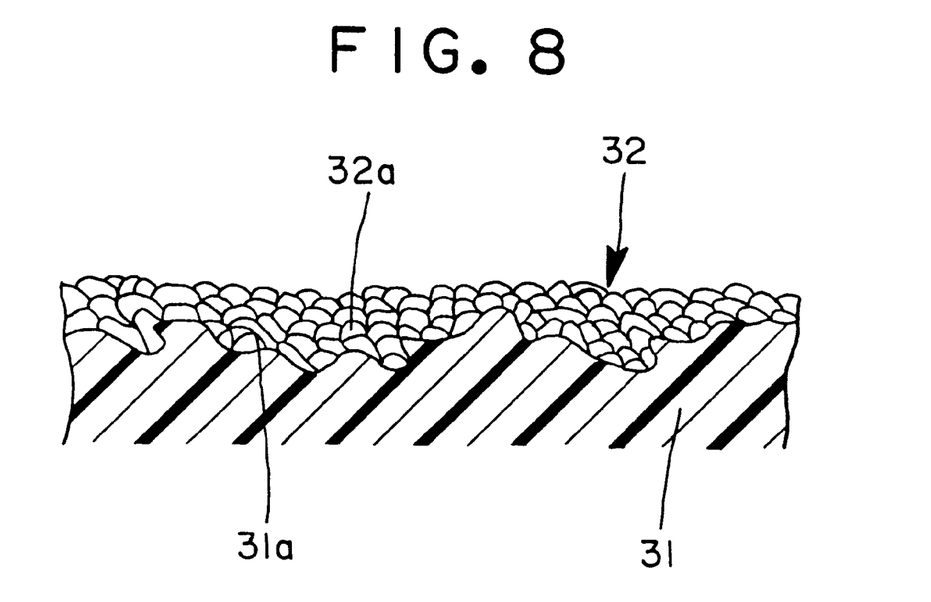
FIG. 8 is an enlarged section showing a portion of FIG. 7.

As shown in FIGS. 3, 7 and 8, the conductive film 32 is made of a thermal spray-coated conductive metal such as tin, lead or zinc. This metal is heated and melted into grains, and these molten grains are sprayed to coat one face of the flat plate 31 by means of the (not-shown) sprayer. At this time, the face of the flat plate 31 is so masked (although not shown) that the conductive film 32 is formed into a predetermined pattern. On the other hand, the metal grains thus sprayed are brought by the spraying force into close contact with the face of the flat plate 31 such that they penetrate so compactly into the surface roughness 31a (or surface coarseness) of the flat plate 31 as to engage with the surface roughness mechanically. This engagement establishes the anchoring effect to fix the conductive film 32 firmly on the face of the flat plate 31.

This flat plate 31 may be roughed in advance on its one face by the machining method. Then, the surface area of the flat plate 31 can be increased, and the surface roughness 31a can be ensured to enhance the anchoring effect better. On the other hand, the flat plate 31 may be made of a synthetic resin containing a fibrous material. Then, the granular metal 32a forming the conductive film 32 is entangled by the fibers of the flat plate 31, so that the conductive film 32 can be fixed more firmly on the flat plate 31.

The conductive film 32 is formed by laminating the granular metal 32a, the kind of which can be freely selected and changed for each layer. In the conductive film 32, therefore, there can be uniformly mixed a plurality of kinds of metals including a metal suited for the radio waves receiving operations and a metal having a coefficient of expansion similar to that of the flat plate 31. As a result, the performance (mainly for the radio waves receiving function) as the antenna can be improved while retaining the strong fixture between the conductive film 32 and the flat plate 31.

Figure 9:
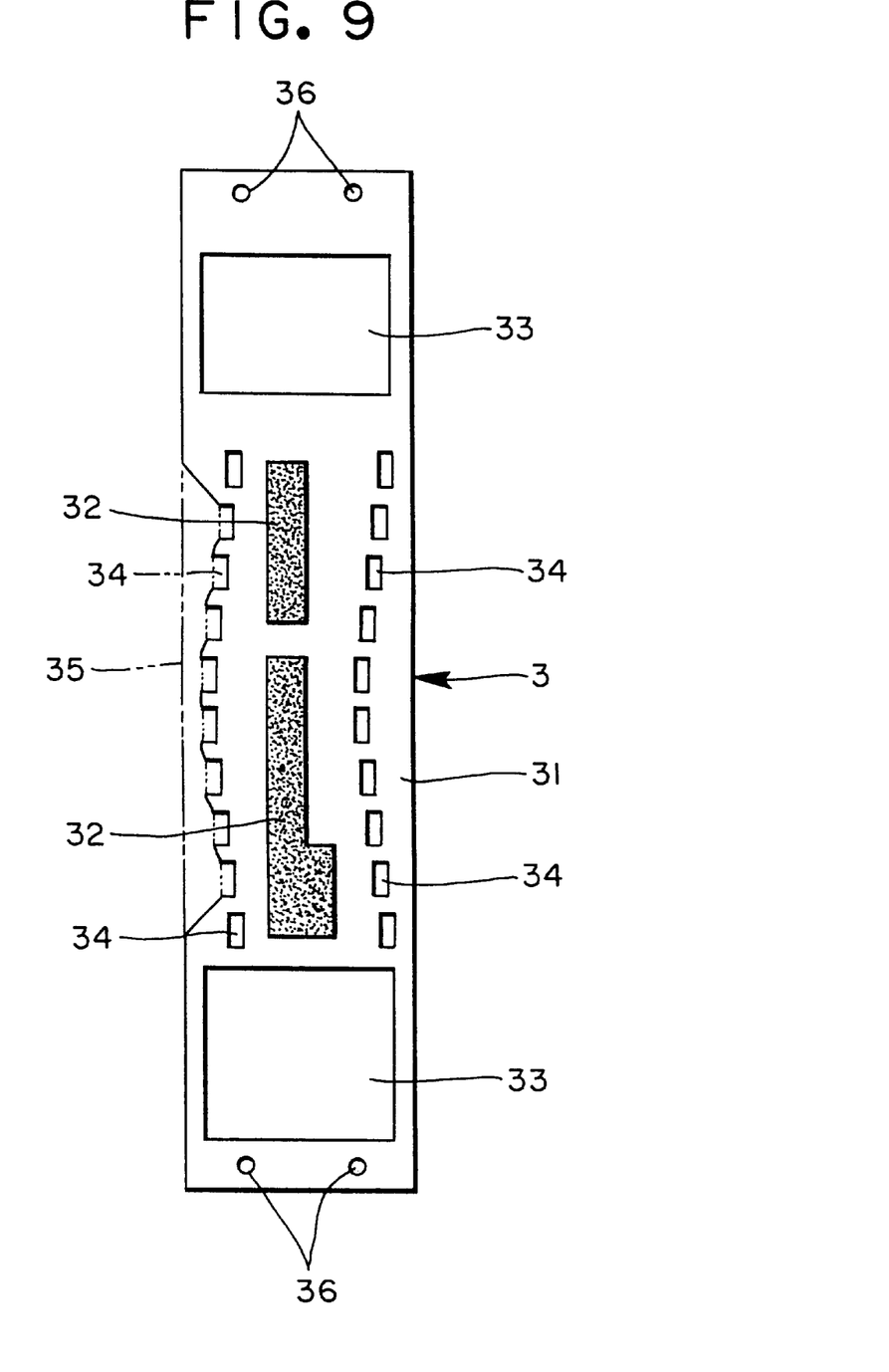
FIG. 9 is a top plan view showing a preferred example of the antenna body.

FIG. 9 shows a preferred embodiment of the antenna body 3. The flat plate 31 of the antenna body 3 is provided with not only the conductive film 32 but also through holes 33 and 33 which are formed in the two longitudinal ends of the flat plate 31 to extend through portions of an upper die. In the two sides of the conductive film 32, there are arranged a plurality of perforations 34 having a size of 20×55 mm and a spacing of 25 mm. The flat plate 31 is so cut partially at 35 in one side thereof as to open the perforations 34 to the outside. Small holes 36, as formed in the two ends of the flat plate 31, are used for retaining the flat plate 31 on the dampers 4a and 5a.

Figure 10:
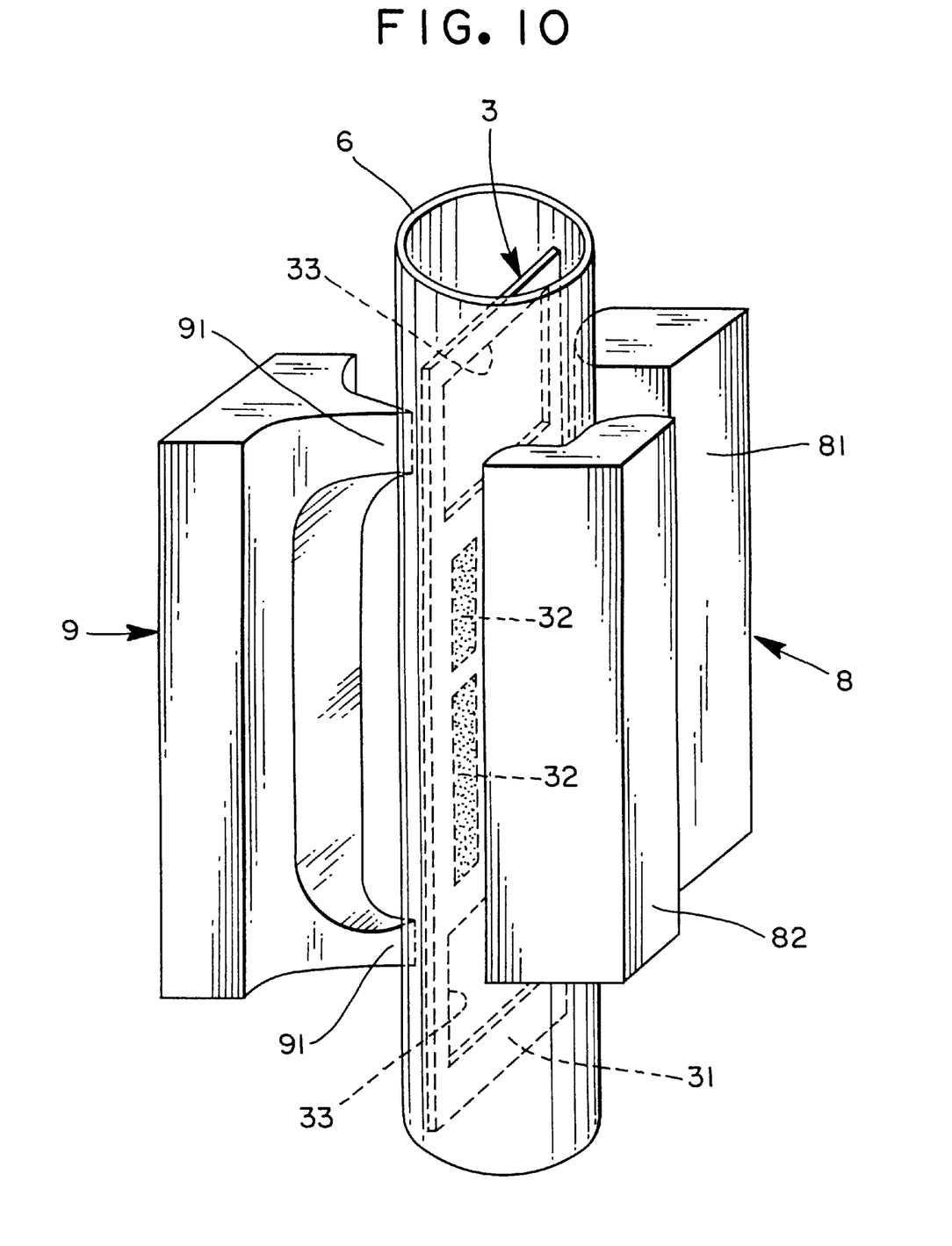
FIG. 10 is a perspective view showing the state in which a parison and the antenna body are combined in a molding die.

As shown in FIG. 10, the molding die for the spoiler is composed of the bottom part 8 and the top part 9. Of these, the bottom part 8 is of the two-split type composed of a stationary bottom part 81 and a slide bottom part 82 and is brought obliquely downward at an angle of about 20 degrees toward the top part 9, until it is integrated with the stationary bottom part 81 so that it is clamped with the top part 9.

At the two sides of the top part 9, there are formed projections 91 to be introduced into the through holes 33 of the flat plate 31 of the antenna body 3. In the corresponding portions of the bottom part 8, there are formed recesses for receiving the projections 91.

Figure 11:
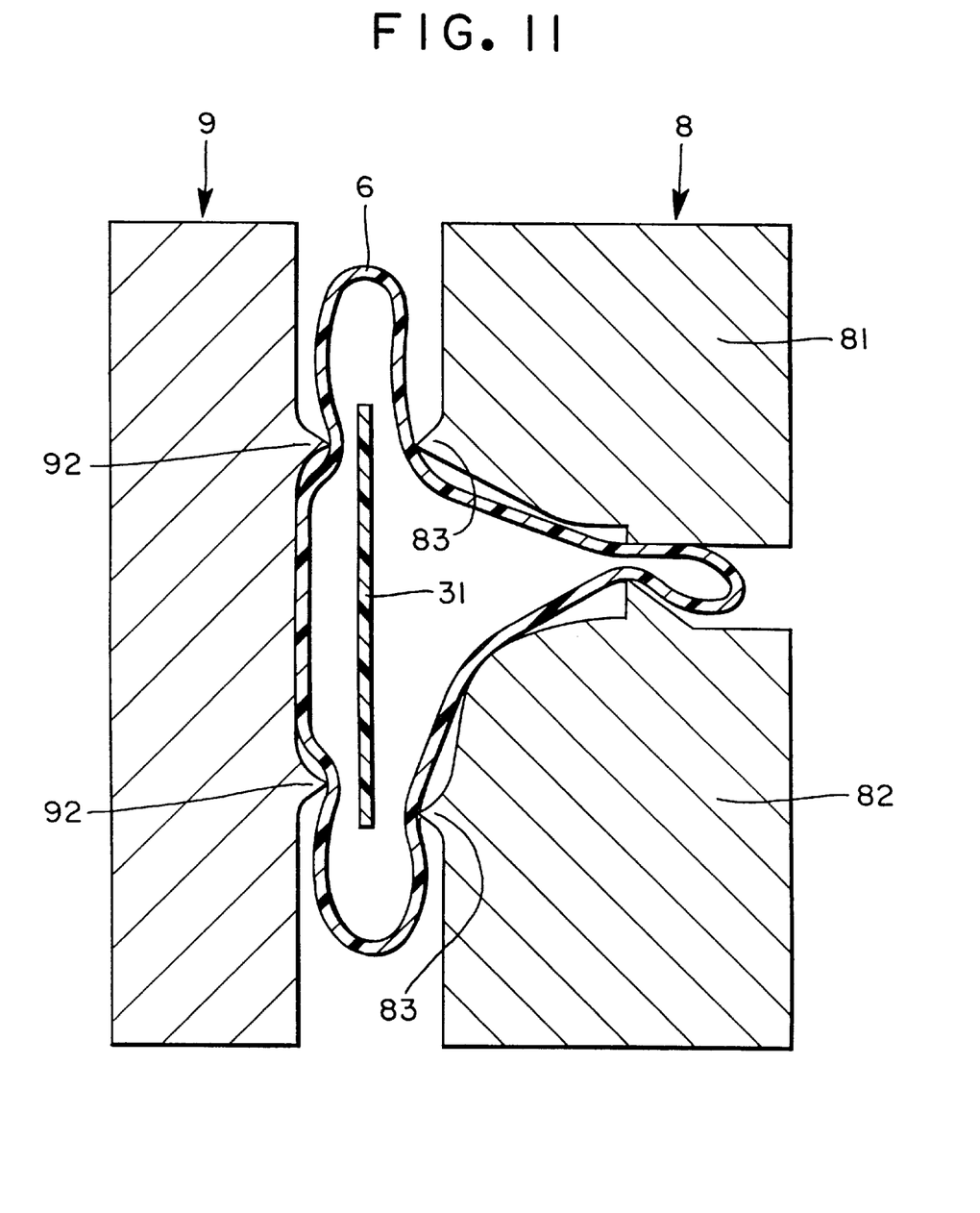
FIG. 11 is a section showing the molding die.

On the confronting faces of the stationary bottom part 81 and the slide bottom part 82 and on the confronting faces of the top part 9, the stationary bottom part 82 and the slide bottom part 82, as shown in FIG. 11, there are formed welding ridges 83 and 92. By bringing the welding ridges 83 and 92 into abutment, the facing parisons 6 (made of PVC resin or the like) can be welded together with the flat plate 31 at a temperature of about 200. At this time, the perforations 34, as located at the sides of the flat plate 31, make it possible to weld the parisons 6 in a higher strength than the welding operation of the parisons 6 sandwiching the flat plate 31.

Thus, the spoiler is manufactured by clamping the molds, by blowing the pressurized air into the space between the parisons 6 to blow mold the parisons 6, by parting the molds and by finishing the welded portions.

As many apparently widely different embodiments of the present invention can be made without departing from the spirit and scope thereof, it is to be understood that the invention is not limited to the specific embodiments thereof except as defined in the appended claims.

What is claimed is:

1. A vehicular exterior trim accessory having a built-in antenna comprising: a hollow body of a predetermined shape constructed to form an internal space by holding a first shell and a second shell in abutment against each other; and an antenna body fixed in said hollow body and arranged in said internal space by clamping it between the abutting portions of said first shell and said second shell, wherein the abutting portion of said second shell and the peripheral edge of said antenna body are continuously welded into an integral structure through perforations formed on said antenna body.

2. A vehicular exterior trim accessory having a built-in antenna according to claim 1, wherein said antenna body includes: a flat plate; a radio waves receiving member fixed on said flat plate; and a cable fixed on said flat plate and connected with said receiving member.

3. A vehicular exterior trim accessory having a built-in antenna according to claim 2, wherein said flat plate is arranged to partition said internal space into a first space and second space and has through holes formed in predetermined positions to provide communication between said first space and said second space.

4. An antenna built-in vehicular exterior trim accessory according to claim 1, wherein said antenna body includes: a resin substrate melted and fixed integrally in said hollow body; and a conductive film formed in a predetermined pattern and fixed on said substrate by spraying a granular metal.

5. A vehicular spoiler comprising: a spoiler body made of a synthetic resin and formed as a parison by a blow molding method to have an internal space; and an antenna flat plate held at its peripheral edge in said spoiler body and including a conductor fixed thereon by mechanical engagement with a structure roughness of said flat plate, wherein said antenna flat plate is made of a synthetic resin and has a plurality of perforations at a spacing in its two side edges, so that said parison forming said spoiler body is welded directly to said antenna flat plate through said perforations.

6. A vehicular spoiler according to claim 5,
   wherein said antenna flat plate includes die insertion holes formed in its two longitudinal ends for inserting a portion of a blow molding die, so that the end portions of said antenna flat plate having said die insertion holes are cut off after the end of the molding operation.

7. A vehicular spoiler according to claim 6, wherein the perforations in a row, as formed at one of the side edges of said antenna flat plate, are opened sideways to the outside.

8. A vehicular spoiler according to claim 7, wherein the bottom part of said blow molding die includes a slide part and a stationary part, so that the pressurized air is blown into the space of said parison by assembling said slide part and said stationary part and then by assembling said bottom part with a top part.

* * * * *